(12) United States Patent
Hirai

(10) Patent No.: US 11,320,937 B2
(45) Date of Patent: May 3, 2022

(54) DISPLAY SYSTEM AND CONTROL METHOD

(71) Applicant: Panasonic Intellectual Property Management Co., Ltd., Osaka (JP)

(72) Inventor: Atsushi Hirai, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/375,486

(22) Filed: Jul. 14, 2021

(65) Prior Publication Data
US 2021/0342056 A1    Nov. 4, 2021

Related U.S. Application Data

(63) Continuation of application No. PCT/JP2020/002023, filed on Jan. 22, 2020.

(30) Foreign Application Priority Data

Feb. 7, 2019  (JP) .............................. JP2019-020998

(51) Int. Cl.
  *G06F 3/041*  (2006.01)
  *G02F 1/133*  (2006.01)
  (Continued)

(52) U.S. Cl.
  CPC ........ *G06F 3/04184* (2019.05); *G02F 1/1368* (2013.01); *G02F 1/13306* (2013.01);
  (Continued)

(58) Field of Classification Search
  CPC ............ G02F 1/13306; G02F 1/13338; G06F 3/041–0428; G06F 3/0488–04886;
  (Continued)

(56) References Cited

U.S. PATENT DOCUMENTS 9,285,937 B2   3/2016  Kida et al.
2013/0215075 A1*  8/2013  Lee ....................... G06F 3/0443
                                             345/174

(Continued)

FOREIGN PATENT DOCUMENTS

JP    2014-132445    7/2014
JP    2016-200886    12/2016

OTHER PUBLICATIONS

International Search Report issued in International Pat. Appl. No. PCT/JP2020/002023, dated Mar. 10, 2020, along with an English translation thereof.

*Primary Examiner* — Sanghyuk Park
(74) *Attorney, Agent, or Firm* — Greenblum & Bernstein, P.L.C.

(57) ABSTRACT

In a display system, a second display device is disposed adjacent to a first display device. The first display device includes a first touch detection region adjacent to the second display device. The second display device includes a second touch detection region. A first frame period of the first display device includes a first display period for which the first display device displays an image and a first touch detection period for which a first touch detection circuit performs touch detection in a first touch detection region. A second frame period of the second display device includes a second display period for which the second display device displays an image and a second touch detection period for which a second touch detection circuit performs touch detection in a second touch detection region. Start and end timings of a first touch detection period overlap with a second display period.

12 Claims, 17 Drawing Sheets

(51) Int. Cl.
  *G02F 1/1333* (2006.01)
  *G02F 1/1343* (2006.01)
  *G02F 1/1362* (2006.01)
  *G02F 1/1368* (2006.01)
  *G06F 3/14* (2006.01)

(52) U.S. Cl.
  CPC .... *G02F 1/13338* (2013.01); *G02F 1/134309* (2013.01); *G02F 1/136286* (2013.01); *G06F 3/1423* (2013.01)

(58) Field of Classification Search
  CPC ... G06F 2203/0339; G06F 2203/04101; G06F 2203/04103–04113; G06F 2203/04809; G06F 1/1643; G06F 1/169; G06F 1/1692
  See application file for complete search history.

(56) References Cited

U.S. PATENT DOCUMENTS

| | | |
|---|---|---|
| 2014/0152617 A1 | 6/2014 | Kida et al. |
| 2015/0269897 A1* | 9/2015 | Kitsomboonloha .......................... G09G 3/3648 345/205 |
| 2016/0147350 A1 | 5/2016 | Kida et al. |
| 2017/0075487 A1* | 3/2017 | Huang .............. G02F 1/136286 |
| 2017/0090630 A1* | 3/2017 | Kim ........................ G06F 3/047 |

\* cited by examiner

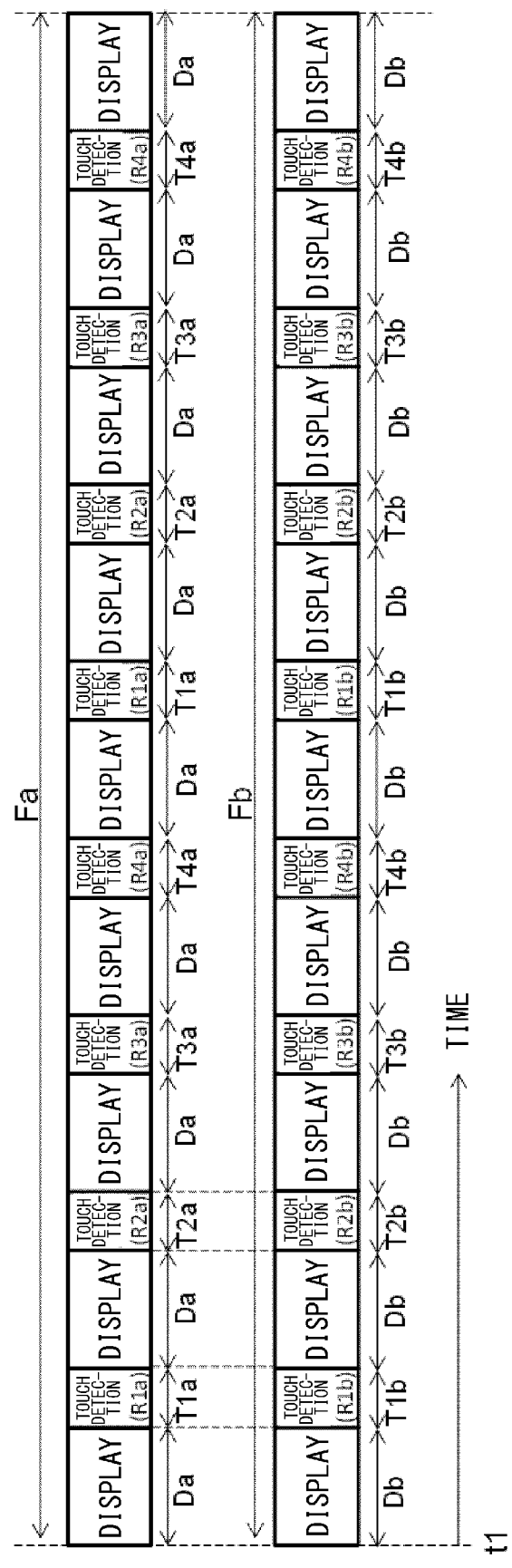
FIG.6 (COMPARATIVE EXAMPLE)

(COMPARATIVE EXAMPLE)

(COMPARATIVE EXAMPLE)

FIG.12
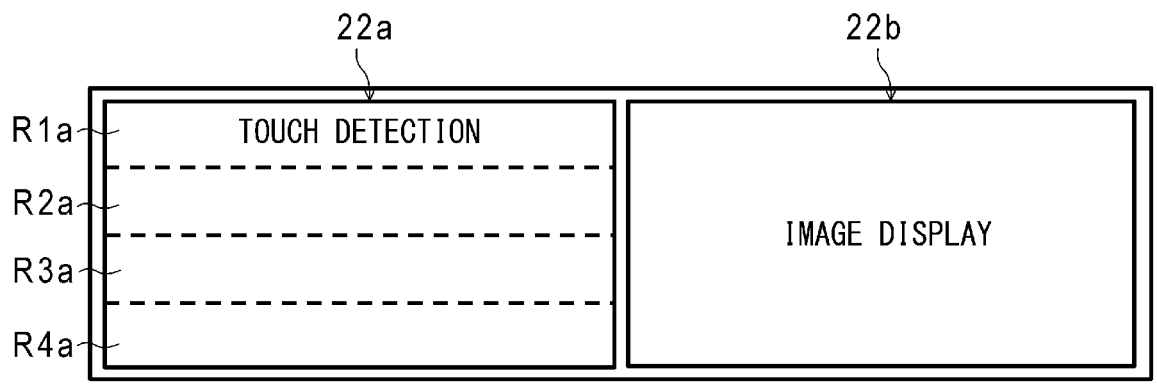
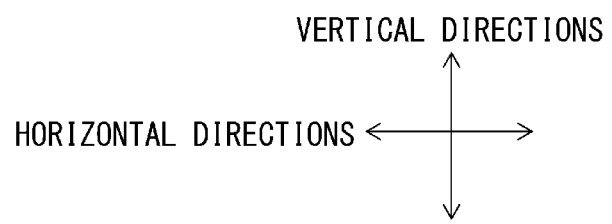

DISPLAY SYSTEM AND CONTROL METHOD

BACKGROUND

1. Field

The present disclosure relates to a display system provided with a touch detection function and to a control method.

2. Description of the Related Art

In recent years, display input devices equipped with touch displays have been in widespread use. In such a touch display, a GUI is displayed on the display screen, and a user inputs an instruction by directly touching the display screen with a finger or the like (see Patent Literatures 1 and 2, for example). The configuration of the display input device of this kind can be simplified, compared to a display input device equipped with an input unit, such as a button and a keyboard, provided separately from the display device. Accordingly, the display input device of this kind is widely employed in mobile terminals or terminals installed in limited spaces, for example.

[Patent Literature 1] Japanese Unexamined Patent Application Publication No. 2014-132445

[Patent Literature 2] Japanese Unexamined Patent Application Publication No. 2016-200886

SUMMARY

For display systems including touch displays, further improvement has been required.

The present disclosure has been made in view of such a situation, and a purpose thereof is to provide a technology for achieving further improvement in display systems.

To solve the problem above, a display system according to one aspect of the present disclosure includes: a first display device; a second display device disposed adjacent to the first display device; a first touch detection circuit that performs detection of a touch by an object on the first display device; a second touch detection circuit that performs detection of a touch by an object on the second display device; and a control circuit that controls the first display device, the second display device, the first touch detection circuit, and the second touch detection circuit. The first display device includes a first touch detection region adjacent to the second display device. The second display device includes a second touch detection region. A first frame period of the first display device includes a first display period for which the first display device displays an image and a first touch detection period for which the first touch detection circuit performs touch detection in a first touch detection region. A second frame period of the second display device includes a second display period for which the second display device displays an image and a second touch detection period for which the second touch detection circuit performs touch detection in a second touch detection region. Start and end timings of a first touch detection period overlap with a second display period.

Another aspect of the present disclosure is a control method. The control method is used in a display system that includes: a first display device; a second display device disposed adjacent to the first display device; a first touch detection circuit that performs detection of a touch by an object on the first display device; and a second touch detection circuit that performs detection of a touch by an object on the second display device. The first display device includes a first touch detection region adjacent to the second display device. The second display device includes a second touch detection region. A first frame period of the first display device includes a first display period for which the first display device displays an image and a first touch detection period for which the first touch detection circuit performs touch detection in a first touch detection region. A second frame period of the second display device includes a second display period for which the second display device displays an image and a second touch detection period for which the second touch detection circuit performs touch detection in a second touch detection region The control method includes controlling the first display device, the second display device, the first touch detection circuit, and the second touch detection circuit such that start and end timings of a first touch detection period overlap with a second display period.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 6 is a diagram that shows timings within the first frame period and the second frame period of a display system in a comparative example;

FIG. 12 is a diagram used to describe operations of the display devices according to a fifth embodiment;

DETAILED DESCRIPTION

Figure 1:
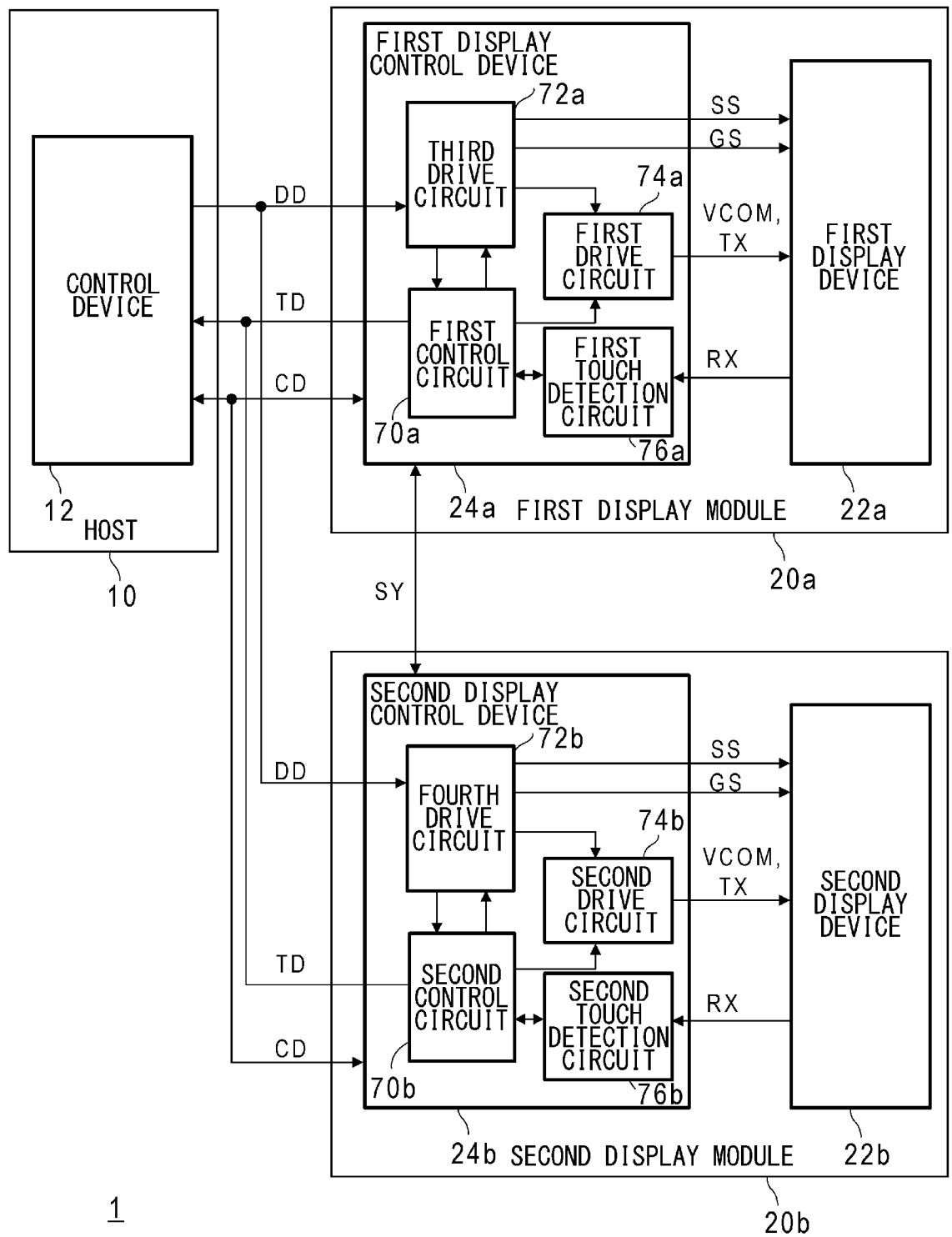
FIG. 1 is a block diagram of a display system according to a first embodiment.

The invention will now be described by reference to the preferred embodiments. This does not intend to limit the scope of the present invention, but to exemplify the invention.

Base Findings of Present Disclosure

Before specific description of embodiments is given, the base findings will be described. For touch displays, reducing influence of noise is desired in terms of operational stability. As technologies for reducing influence of exogenous noise, which is caused by operations of external devices and the like, on touch displays, the technologies described in the aforementioned Patent Literatures 1 and 2 are known, for example.

Meanwhile, two touch displays may be sometimes arranged next to each other. The inventor has found that, in such arrangement, noise caused by touch drive signals in the touch displays interferes with each other, which affects touch detection. To solve the problem, a display system according to the present disclosure is configured as described below.

Like reference characters denote like or corresponding constituting elements, members, and processes in each drawing, and repetitive description will be omitted as appropriate. Also, the dimensions of a member may be appropriately enlarged or reduced in each drawing in order to facilitate understanding.

First Embodiment

FIG. 1 is a block diagram of a display system 1 according to the first embodiment. Although an example will be described in which the display system 1 is a vehicle-mounted display system 1 mounted on a vehicle, such as an automobile, the application is not particularly limited, and the display system 1 may also be used for a mobile device.

The display system 1 includes a host 10, a first display module 20a, and a second display module 20b. In the following, when the first display module 20a and the second display module 20b are not differentiated from each other, they may be referred to as display modules 20. The display modules 20 are also called display panels.

The host 10 performs various functions, such as radio, car navigation, and Bluetooth (registered trademark) communication, and controls the two display modules 20. The host 10 includes a control device 12.

The control device 12 may be a CPU, for example, and also called a host CPU. The control device 12 supplies image data DD and control data CD to the two display modules 20 and controls the two display modules 20 based on such data.

The first display module 20a includes a first display device 22a and a first display control device 24a. The second display module 20b includes a second display device 22b and a second display control device 24b. In the following, when the first display device 22a and the second display device 22b are not differentiated from each other, they may be referred to as display devices 22; when the first display control device 24a and the second display control device 24b are not differentiated from each other, they may be referred to as display control devices 24.

The two display devices 22 may be used as center displays on which a car navigation screen or the like is displayed within a vehicle cabin, for example, and may be arranged horizontally or vertically adjacent to each other. The two display devices 22 may respectively display parts of one screen, such as a car navigation screen, so that the two screens form the one screen. Alternatively, one display device 22 may display a first screen, such as a car navigation screen, and the other display device 22 may display a second screen, such as a television screen, different from the first screen.

Each display device 22 is an in-cell liquid crystal display device of an in plane switching (IPS) type and configured as a touch display on which a touch position can be detected. The configuration of each display device 22 may be a well-known configuration as described below, for example.

Figure 2:
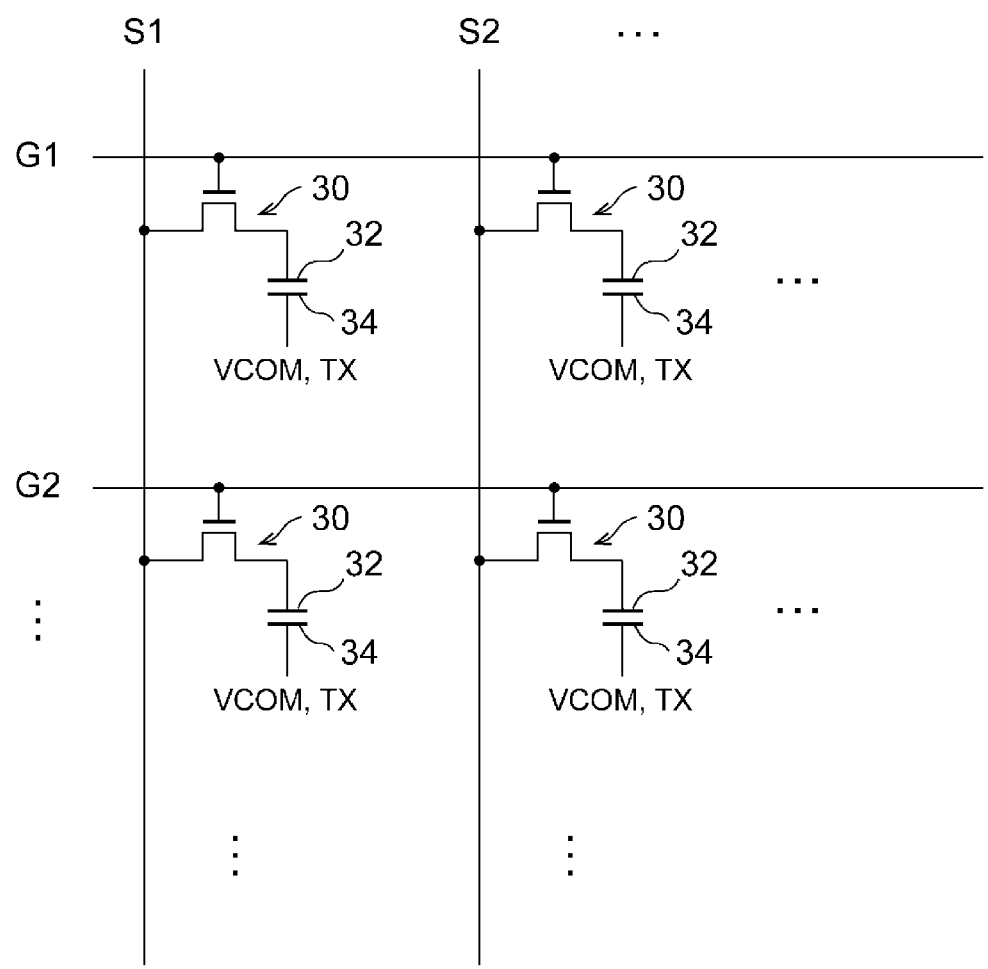
FIG. 2 is a diagram that schematically shows a circuit configuration of a display device shown in FIG. 1.

FIG. 2 schematically shows a circuit configuration of each display device 22 shown in FIG. 1. FIG. 2 also shows schematic arrangement of constituting elements. Each display device 22 includes multiple gate lines G1, G2, and so on extending in a row direction, multiple source lines S1, S2, and so on extending in a column direction, multiple pixel switching elements 30, multiple pixel electrodes 32, and multiple common electrodes 34. Each pixel switching element 30 is a thin-film transistor provided near an intersection of a gate line and a source line such as to correspond to a pixel. In each pixel switching element 30, the gate is connected with a gate line, the source is connected with a source line, and the drain is connected with a pixel electrode 32. For one common electrode 34, multiple pixel switching elements 30 and multiple pixel electrodes 32 are arranged. The liquid crystal layer is controlled by means of electric fields between pixel electrodes 32 and common electrodes 34. The common electrodes 34 are used for both image display and touch detection. Accordingly, the number of electrode layers can be reduced, so that the display devices 22 can be made thinner.

Figure 3:
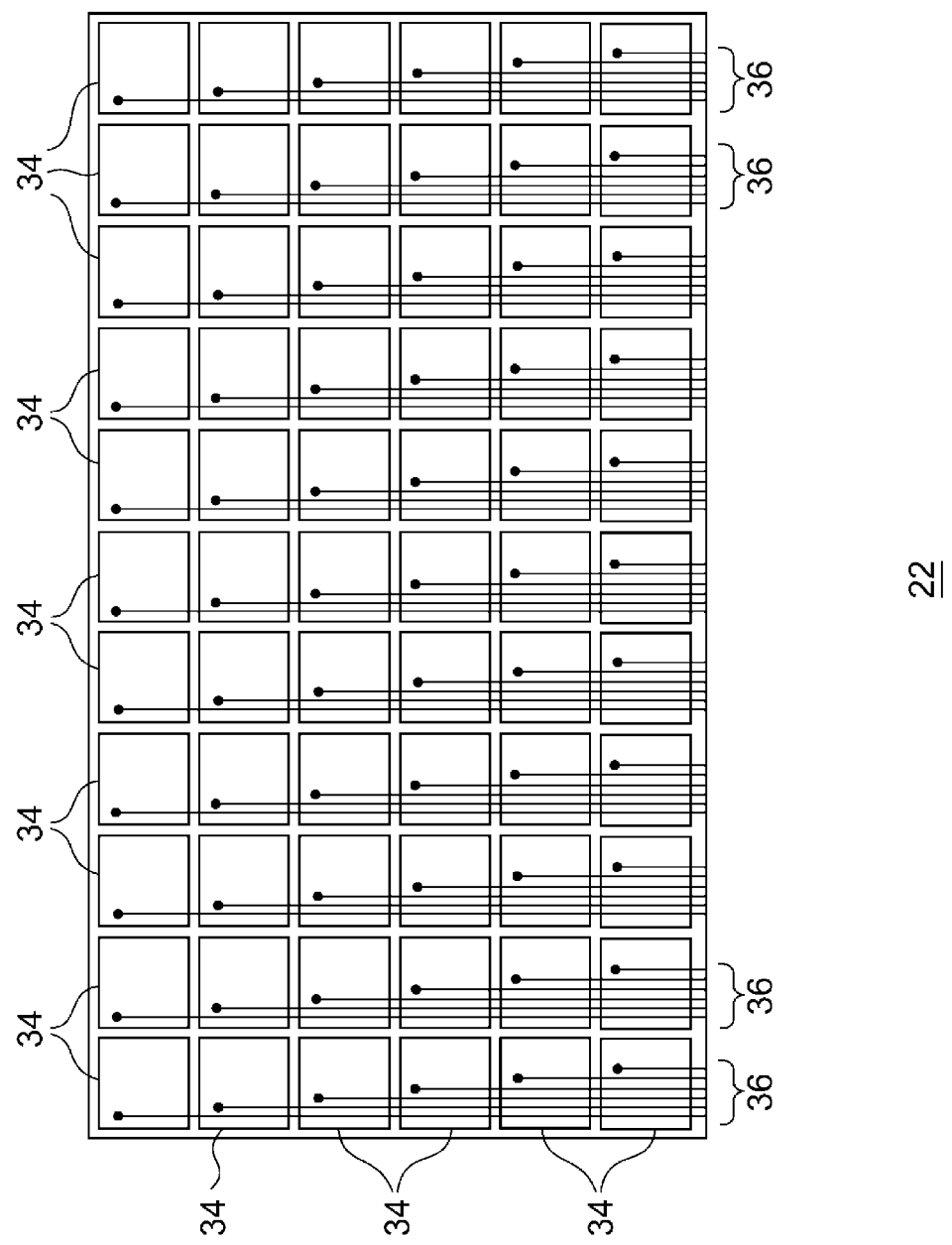
FIG. 3 is a top view that shows arrangement of common electrodes shown in FIG. 2.

FIG. 3 is a top view that shows arrangement of the common electrodes 34 shown in FIG. 2. The multiple common electrodes 34 are arranged in a matrix. Each common electrode 34 in the first display device 22a is connected to the first display control device 24a with a signal line 36, and each common electrode 34 in the second display device 22b is connected to the second display control device 24b with a signal line 36.

Each display device 22 detects a touch position based on the self-capacitance method. When a finger is brought closer to the display surface of a display device 22, capacitance is formed between a common electrode 34 and the finger. The formation of capacitance increases parasitic capacitance in the common electrode 34, so that the current flowing when a touch drive signal is supplied to the common electrode 34 is increased. Based on the current variation, the touch position is detected.

The description now returns to FIG. 1. The first display control device 24a may be configured as an IC, for example, and controls the first display device 22a based on the control data CD and the image data DD from the host 10. The first display control device 24a includes a first control circuit 70a, a third drive circuit 72a, a first drive circuit 74a, and a first touch detection circuit 76a.

The first control circuit 70a may be configured as a microcomputer, for example, and controls signal generation timings of the third drive circuit 72a and the first drive circuit 74a, touch detection timings of the first touch detection circuit 76a, and the like.

The first control circuit 70a controls the third drive circuit 72a, the first drive circuit 74a, and the first touch detection circuit 76a such that, during a first frame period, one frame of a display image is rendered on the first display device 22a and touch detection for one screen is performed at least once. The first frame period may also be referred to as a first vertical synchronization period. The first frame period will be detailed later.

The third drive circuit 72a generates a first reference clock signal under the control of the first control circuit 70a. The third drive circuit 72a also generates, under the control of the first control circuit 70a, a source signal SS in synchronization with the generated first reference clock signal, based on the image data DD from the host 10. The third drive circuit 72a also generates, under the control of the first control circuit 70a, a gate signal GS in synchronization with the generated first reference clock signal.

The third drive circuit 72a supplies the source signal SS serially to multiple source lines in the first display device 22a, and also supplies the gate signal GS serially to multiple gate lines in the first display device 22a.

The third drive circuit 72a supplies the first reference clock signal to the first drive circuit 74a. The first drive circuit 74a generates a reference voltage VCOM, which is a predetermined fixed voltage, and a touch drive signal TX, which is a square wave signal in synchronization with the first reference clock signal, under the control of the first control circuit 70a. Through the signal lines 36 shown in FIG. 3, the first drive circuit 74a supplies the reference voltage VCOM or the touch drive signal TX to the multiple common electrodes 34 of the entire first display device 22a.

The first touch detection circuit 76a detects a touch by an object on the first display device 22a. Under the control of the first control circuit 70a, the first touch detection circuit 76a receives, from a common electrode 34, a touch detection signal RX when the touch drive signal TX is supplied to the common electrodes 34 and performs detection of a touch position based on the touch detection signal RX. The first touch detection circuit 76a outputs touch position information regarding the touch position thus detected to the first control circuit 70a.

Based on the touch position information from the first touch detection circuit 76a, the first control circuit 70a derives coordinate data TD of the touch position and outputs the coordinate data TD to the control device 12 in the host 10. The control device 12 performs various processes based on the coordinate data TD.

Based on the first reference clock signal, the third drive circuit 72a outputs a synchronization signal SY to the second display control device 24b at the start timing of each first frame period, for example. The output timing of the synchronization signal SY is not particularly limited, as long as signals can be synchronized between the first display control device 24a and the second display control device 24b.

The second display control device 24b may be configured as an IC, for example, and controls the second display device 22b based on the control data CD and the image data DD from the host 10 and the synchronization signal SY from the first display control device 24a. The basic operations of the second display control device 24b are the same as those of the first display control device 24a, but the operation timings are different. The second display control device 24b includes a second control circuit 70b, a fourth drive circuit 72b, a second drive circuit 74b, and a second touch detection circuit 76b.

The second control circuit 70b may be configured as a microcomputer, for example, and controls signal generation timings of the fourth drive circuit 72b and the second drive circuit 74b, touch detection timings of the second touch detection circuit 76b, and the like, based on the synchronization signal SY. The second control circuit 70b and the aforementioned first control circuit 70a may be collectively referred to as control circuits.

The second control circuit 70b controls the fourth drive circuit 72b, the second drive circuit 74b, and the second touch detection circuit 76b such that, during a second frame period, one frame of a display image is rendered on the second display device 22b and touch detection for one screen is performed at least once. Based on the synchronization signal SY, the second control circuit 70b provides control such that the start timing of the second frame period is delayed by a predetermined time from the start timing of the first frame period. The second frame period may also be referred to as a second vertical synchronization period. The second frame period will be detailed later.

The fourth drive circuit 72b generates a second reference clock signal under the control of the second control circuit 70b. The fourth drive circuit 72b also generates, under the control of the second control circuit 70b, a source signal SS in synchronization with the generated second reference clock signal, based on the image data DD from the host 10. The fourth drive circuit 72b also generates, under the control of the second control circuit 70b, a gate signal GS in synchronization with the generated second reference clock signal.

The fourth drive circuit 72b supplies the source signal SS serially to multiple source lines in the second display device 22b, and also supplies the gate signal GS serially to multiple gate lines in the second display device 22b.

The fourth drive circuit 72b supplies the second reference clock signal to the second drive circuit 74b. The second drive circuit 74b generates a reference voltage VCOM, and a touch drive signal TX, which is a square wave signal in synchronization with the second reference clock signal, under the control of the second control circuit 70b. Through the signal lines 36 shown in FIG. 3, the second drive circuit 74b supplies the reference voltage VCOM or the touch drive signal TX to the multiple common electrodes 34 of the entire second display device 22b.

The second touch detection circuit 76b detects a touch by an object on the second display device 22b. Under the control of the second control circuit 70b, the second touch detection circuit 76b receives, from a common electrode 34, a touch detection signal RX when the touch drive signal TX is supplied to the common electrodes 34 and performs detection of a touch position based on the touch detection signal RX. The second touch detection circuit 76b outputs touch position information regarding the touch position thus detected to the second control circuit 70b.

Based on the touch position information from the second touch detection circuit 76b, the second control circuit 70b derives coordinate data TD of the touch position and outputs the coordinate data TD to the control device 12.

The configurations of the control device 12, the first control circuit 70a, and the second control circuit 70b can be implemented by cooperation between hardware resources and software resources or only by hardware resources. As the hardware resources, analog devices, microcomputers, DSPs, ROMs, RAMs, FPGAs, or other LSIs can be employed. As the software resources, programs, such as firmware, can be employed.

Figure 4:
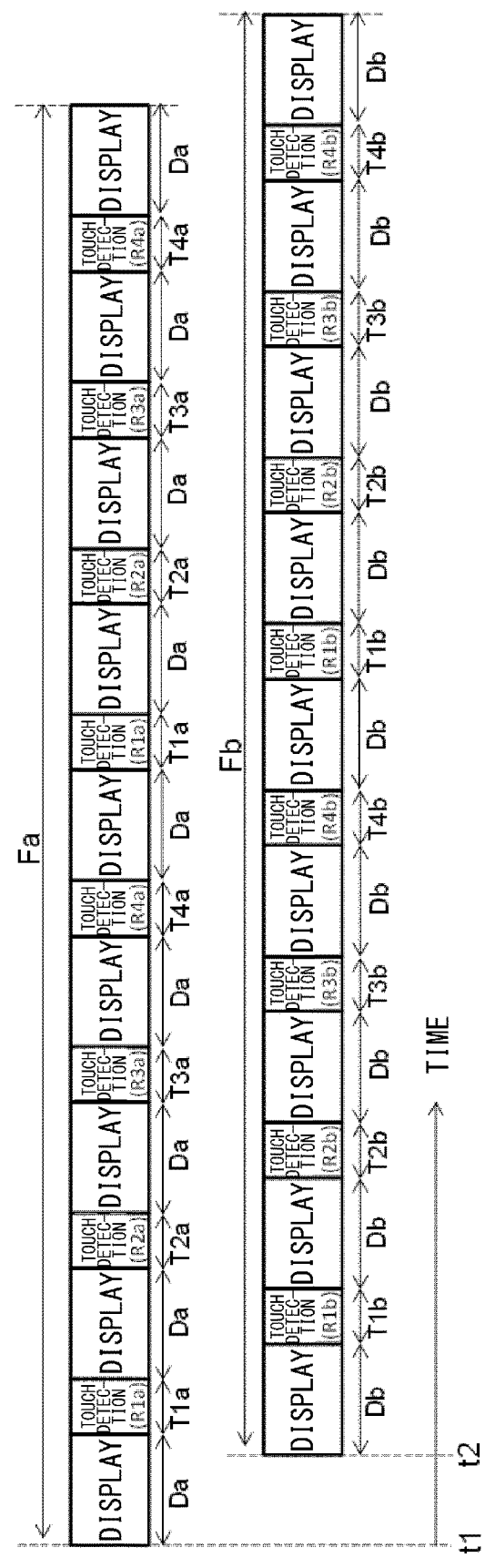
FIG. 4 is a diagram that shows timings within a first frame period of a first display device and a second frame period of a second display device.

FIG. 4 shows timings within a first frame period Fa of the first display device 22a and a second frame period Fb of the second display device 22b.

The first frame period Fa includes nine first display periods Da, two first touch detection periods T1a, two first touch detection periods T2a, two first touch detection periods T3a, and two first touch detection periods T4a. The first display periods Da and the first touch detection periods are alternately arranged. In the first frame period Fa, the first display period Da, first touch detection period T1a, first display period Da, first touch detection period T2a, first display period Da, first touch detection period T3a, first display period Da, first touch detection period T4a, first display period Da, first touch detection period T1a, first display period Da, first touch detection period T2a, first display period Da, first touch detection period T3a, first display period Da, first touch detection period T4a, and first display period Da are arranged in this order.

The second frame period Fb includes nine second display periods Db, two second touch detection periods T1b, two second touch detection periods T2b, two second touch detection periods T3b, and two second touch detection periods T4b. The second display periods Db and the second touch detection periods are alternately arranged. In the second frame period Fb, the second display period Db, second touch detection period T1b, second display period Db, second touch detection period T2b, second display period Db, second touch detection period T3b, second display period Db, second touch detection period T4b, second display period Db, second touch detection period T1b, second display period Db, second touch detection period T2b, second display period Db, second touch detection period T3b, second display period Db, second touch detection period T4b, and second display period Db are arranged in this order.

The start and end timings of each of the multiple first touch detection periods T1a through T4a overlap with one of the multiple second display periods Db.

The start and end timings of each of the multiple second touch detection periods T1b through T4b overlap with one of the multiple first display periods Da.

The first display periods Da and the second display periods Db each have the same length. Also, the first touch detection periods T1a through T4a and the second touch detection periods T1b through T4b each have the same length. The length of each of the first display periods Da and the second display periods Db is longer than the length of each of the first touch detection periods T1a through T4a and the second touch detection periods T1b through T4b.

The first frame period Fa and the second frame period Fb have the same length. The start timing (time t1) of the first frame period Fa is different from the start timing (time t2) of the second frame period Fb.

The number of first display periods Da in the first frame period Fa and the number of second display periods Db in the second frame period Fb are not limited to "nine". Also, the number of first touch detection periods in the first frame period Fa and the number of second touch detection periods in the second frame period Fb are not limited to "eight".

Figure 5A:
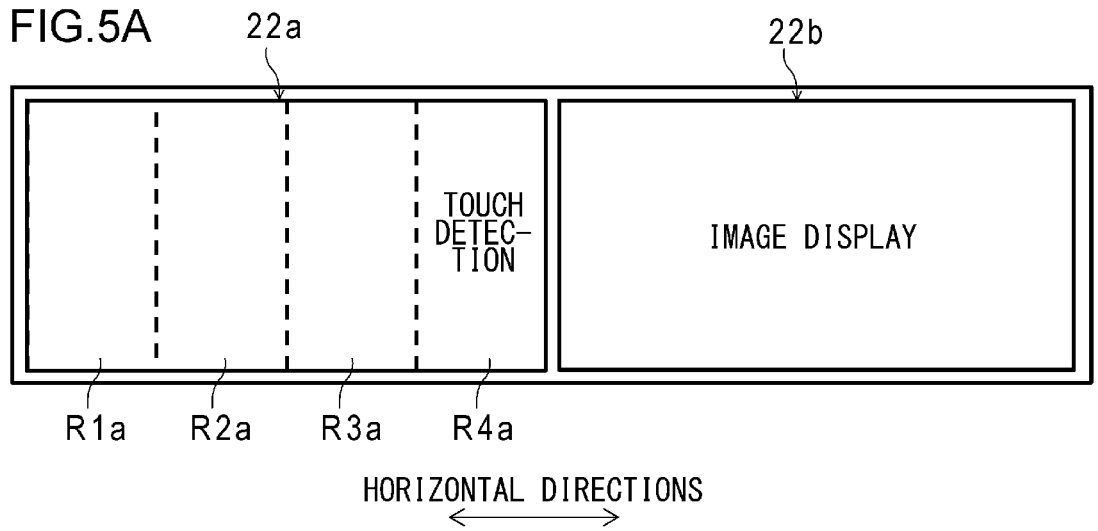
FIG. 5A is a diagram used to describe operations of the display devices in a first touch detection period shown in FIG. 4.
Figure 5B:
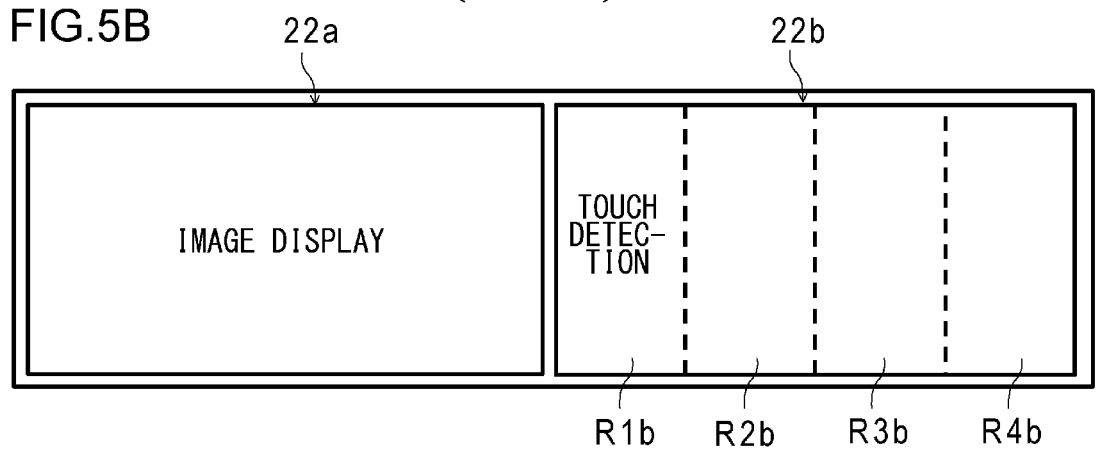
FIG. 5B is a diagram used to describe operations of the display devices in a second touch detection period shown in FIG. 4.

FIG. 5A is a diagram used to describe operations of the display devices 22 in the first touch detection period T4a shown in FIG. 4. FIG. 5B is a diagram used to describe operations of the display devices 22 in the second touch detection period T1b shown in FIG. 4.

The first display device 22a and the second display device 22b are arranged horizontally adjacent to each other when viewed from the viewer.

The first display device 22a includes first touch detection regions R1a, R2a, R3a, and R4a arranged in this order in a direction toward the second display device 22b. In other words, the first touch detection regions R1a, R2a, R3a, and R4a are arranged in a horizontal direction, which is a direction along the arrangement direction of the first display device 22a and the second display device 22b. The rightmost first touch detection region R4a is adjacent to the second display device 22b. Among the multiple common electrodes 34 of the entire first display device 22a, multiple common electrodes 34 are arranged in each of the first touch detection regions R1a through R4a.

The second display device 22b includes second touch detection regions R1b, R2b, R3b, and R4b arranged in this order in a direction away from the first display device 22a. In other words, the second touch detection regions R1b, R2b, R3b, and R4b are horizontally arranged. The leftmost second touch detection region R1b is adjacent to the first display device 22a. Among the multiple common electrodes 34 of the entire second display device 22b, multiple common electrodes 34 are arranged in each of the second touch detection regions R1b through R4b. The number of touch detection regions in a display device 22 is not limited to "four".

Referring back to FIG. 4, the first display device 22a displays one-ninth of a frame for each first display period Da. Accordingly, one frame is displayed in the nine first display periods Da within the first frame period Fa. More specifically, during each first display period Da, the third drive circuit 72a supplies the source signal SS to the multiple source lines and also supplies the gate signal GS to corresponding gate lines, and the first drive circuit 74a supplies the reference voltage VCOM to the multiple common electrodes 34. During each first display period Da, the touch drive signal TX is not supplied to the common electrodes 34.

The first touch detection circuit 76a performs touch detection in a first touch detection region different for each first touch detection period. More specifically, the first touch detection circuit 76a performs touch detection in the first touch detection region R1a during the first touch detection period T1a, performs touch detection in the first touch detection region R2a during the first touch detection period T2a, performs touch detection in the first touch detection region R3a during the first touch detection period T3a, and performs touch detection in the first touch detection region R4a during the first touch detection period T4a. During the eight first touch detection periods in the first frame period Fa, touch detection for one screen is performed twice.

More specifically, during each first touch detection period, the first drive circuit 74a supplies the touch drive signal TX to the multiple common electrodes 34 of the entire first display device 22a. Accordingly, during each first touch detection period, based on the touch detection signals RX received from multiple common electrodes 34 in a first touch detection region as a detection target, the first touch detection circuit 76a performs touch detection in the first touch detection region as a detection target. During each touch detection period, the reference voltage VCOM is not supplied to the common electrodes 34.

The second display device 22b displays an image of one-ninth of a frame for each second display period Db. Accordingly, one frame is displayed in the nine second display periods Db within the second frame period Fb. More specifically, during each second display period Db, the fourth drive circuit 72b supplies the source signal SS to the multiple source lines and also supplies the gate signal GS to corresponding gate lines, and the second drive circuit 74b supplies the reference voltage VCOM to the multiple common electrodes 34. During each second display period Db, the touch drive signal TX is not supplied to the common electrodes 34.

The second touch detection circuit 76b performs touch detection in a second touch detection region different for each second touch detection period. More specifically, the second touch detection circuit 76b performs touch detection in the second touch detection region R1b during the second touch detection period T1b, performs touch detection in the second touch detection region R2b during the second touch detection period T2b, performs touch detection in the second touch detection region R3b during the second touch detection period T3b, and performs touch detection in the second touch detection region R4b during the second touch detection period T4b. During the eight second touch detection periods in the second frame period Fb, touch detection for one screen is performed twice.

More specifically, during each second touch detection period, the second drive circuit 74b supplies the touch drive signal TX to the multiple common electrodes 34 of the entire second display device 22b. Accordingly, during each second touch detection period, based on the touch detection signals RX received from multiple common electrodes 34 in a second touch detection region as a detection target, the second touch detection circuit 76b performs touch detection in the second touch detection region as a detection target. During each touch detection period, the reference voltage VCOM is not supplied to the common electrodes 34.

As shown in FIG. 5A, during the first touch detection period T4a shown in FIG. 4, touch detection in the first touch detection region R4a adjacent to the second display device 22b is performed in the first display device 22a, and image display is performed in the second display device 22b. Accordingly, during the touch detection in the first touch detection region R4a, touch detection is not performed in the second display device 22b, so that the touch drive signal TX is not supplied to the multiple common electrodes 34 in the second display device 22b.

As shown in FIG. 5B, during the second touch detection period T1b shown in FIG. 4, touch detection in the second touch detection region R1b adjacent to the first display device 22a is performed in the second display device 22b, and image display is performed in the first display device 22a. Accordingly, during the touch detection in the second touch detection region R1b, touch detection is not performed in the first display device 22a, so that the touch drive signal TX is not supplied to the multiple common electrodes 34 in the first display device 22a.

A comparative example will now be described. FIG. 6 shows timings within the first frame period Fa and the second frame period Fb of a display system in a comparative example. The comparative example differs from the present embodiment in that the start timing of the first frame period Fa coincides with the start timing of the second frame period Fb, the start timings of the first display periods Da coincide with the start timings of the respective second display periods Db, and the start timings of the first touch detection periods coincide with the start timings of the respective second touch detection periods. Accordingly, in the two display devices 22 of the comparative example, image display is simultaneously performed, and touch detection is also simultaneously performed.

Figure 7A:
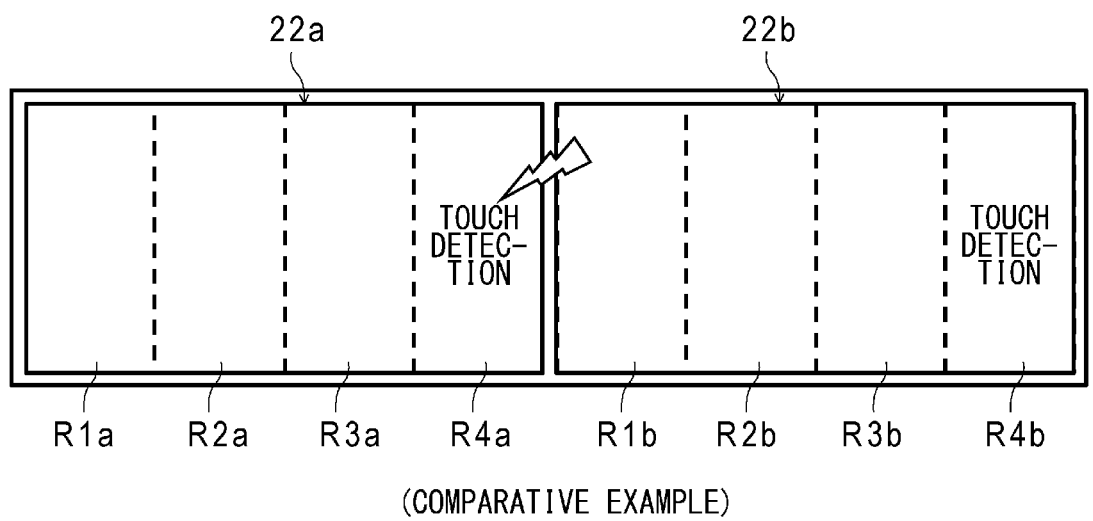
FIG. 7A is a diagram used to describe operations of the display devices in a first touch detection period shown in FIG. 6.
Figure 7B:
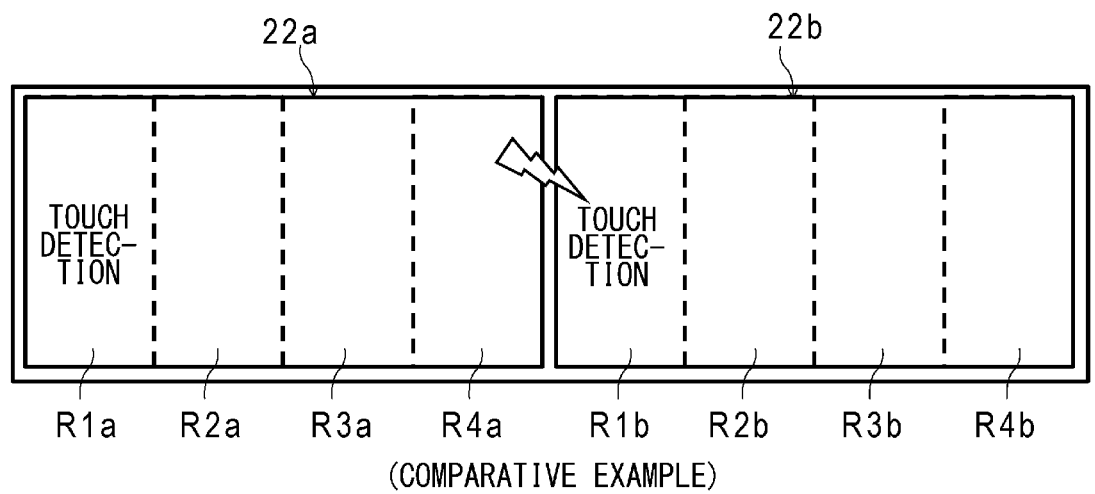
FIG. 7B is a diagram used to describe operations of the display devices in a second touch detection period shown in FIG. 6.

FIG. 7A is a diagram used to describe operations of the display devices 22 in the first touch detection period T4a shown in FIG. 6. FIG. 7B is a diagram used to describe operations of the display devices 22 in the second touch detection period T1b shown in FIG. 6.

As shown in FIG. 7A, during the first touch detection period T4a, touch detection in the first touch detection region R4a adjacent to the second display device 22b is performed in the first display device 22a, and touch detection in the second touch detection region R4b is performed in the second display device 22b. Accordingly, during the touch detection in the first touch detection region R4a, the touch drive signal TX is supplied to the multiple common electrodes 34 of the entire second display device 22b. This may cause noise due to the touch drive signal TX supplied to the common electrodes 34 in the second display device 22b closest to the first display device 22a, and the noise may affect the electric charges of common electrodes 34 in the first touch detection region R4a. As a result, a touch detection signal Rx in the first touch detection region R4a may be changed, so that the first touch detection circuit 76a may incorrectly detect contact even when no object is in contact with the first touch detection region R4a.

As shown in FIG. 7B, during the second touch detection period T1b, touch detection in the second touch detection region R1b adjacent to the first display device 22a is performed in the second display device 22b, and touch detection in the first touch detection region R1a is performed in the first display device 22a. Also in this case, noise may be caused by the touch drive signal TX supplied to the common electrodes 34 in the first display device 22a closest to the second display device 22b, and a touch detection signal Rx in the second touch detection region R1b may be changed by the noise, so that the second touch detection circuit 76b may incorrectly detect contact even when no object is in contact with the second touch detection region R1b.

In contrast with the comparative example, in the present embodiment, during the touch detection in the first touch detection region R4a adjacent to the second display device 22b, the touch drive signal TX is not supplied to the common electrodes 34 in the second display device 22b, as described with reference to FIGS. 4, 5A, and 5B. Accordingly, there is no influence of noise caused by the touch drive signal TX in the second display device 22b. Also, during the touch detection in the second touch detection region R1b adjacent to the first display device 22a, the touch drive signal TX is not supplied to the common electrodes 34 in the first display device 22a, so that there is no influence of noise caused by the touch drive signal TX in the first display device 22a. Therefore, incorrect detection can be restrained, compared to the comparative example.

Figure 8:
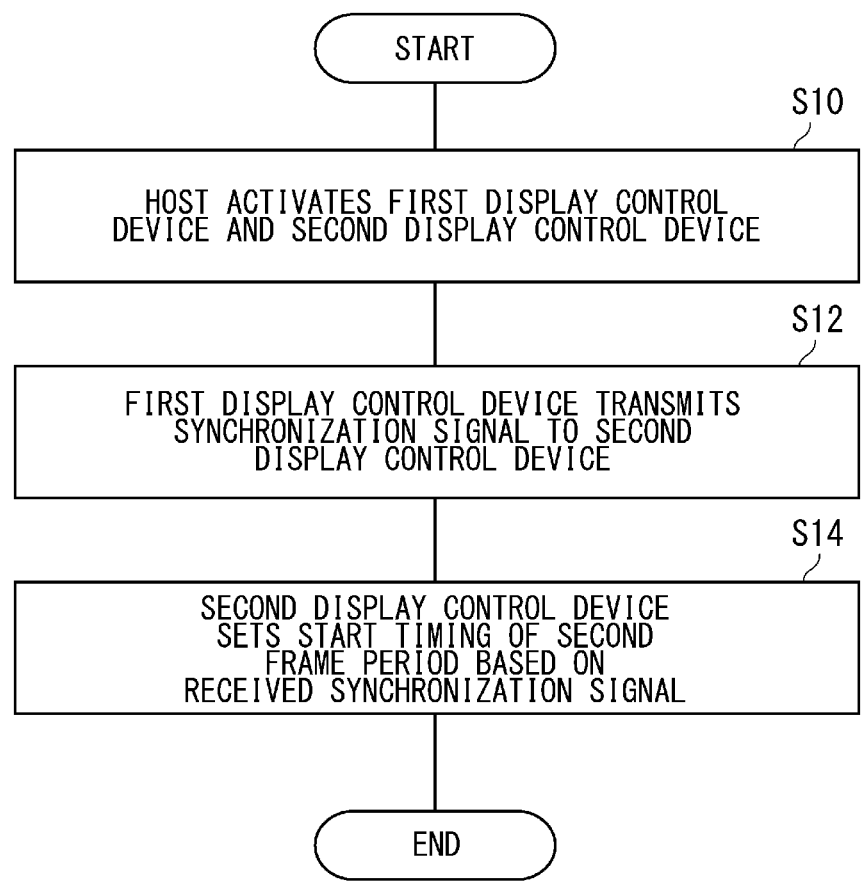
FIG. 8 is a flowchart that shows activation processing in the display system shown in FIG. 1.

There will now be described the overall operation of the display system 1 having the configuration set forth above. FIG. 8 is a flowchart that shows activation processing in the display system 1 shown in FIG. 1. The host 10 activates the first display control device 24a and the second display control device 24b (S10). The first display control device 24a transmits the synchronization signal SY to the second display control device 24b (S12). Based on the synchronization signal SY thus received, the second display control device 24b sets the start timing of the second frame period Fb (S14), and the processing is terminated.

According to the present embodiment, the start and end timings of the first touch detection period T4a for the first touch detection region R4a adjacent to the second display device 22b overlap with a second display period Db.

Accordingly, the touch detection in the first touch detection region R4a is not affected by noise caused by touch detection in the second display device 22b. Therefore, incorrect detection in the touch detection in the first touch detection region R4a can be restrained.

Also, the start and end timings of the second touch detection period T1b for the second touch detection region R1b adjacent to the first display device 22a overlap with a first display period Da. Accordingly, the touch detection in the second touch detection region R1b is not affected by noise caused by touch detection in the first display device 22a. Therefore, incorrect detection in the touch detection in the second touch detection region R1b can be restrained.

Also, the start timing of the first frame period Fa is different from the start timing of the second frame period Fb, but the length of each period and arrangement of periods within the first frame period Fa is identical with the length of each period and arrangement of periods within the second frame period Fb. This can prevent complication of the configuration of the display system 1.

Second Embodiment

The second embodiment differs from the first embodiment in that, in the second frame period Fb, the second display period Db positioned first is longer than the other second display periods Db, and the second display period Db positioned last is shorter than the other second display periods Db. In the following, description will be given mainly for the differences from the first embodiment.

Figure 9:
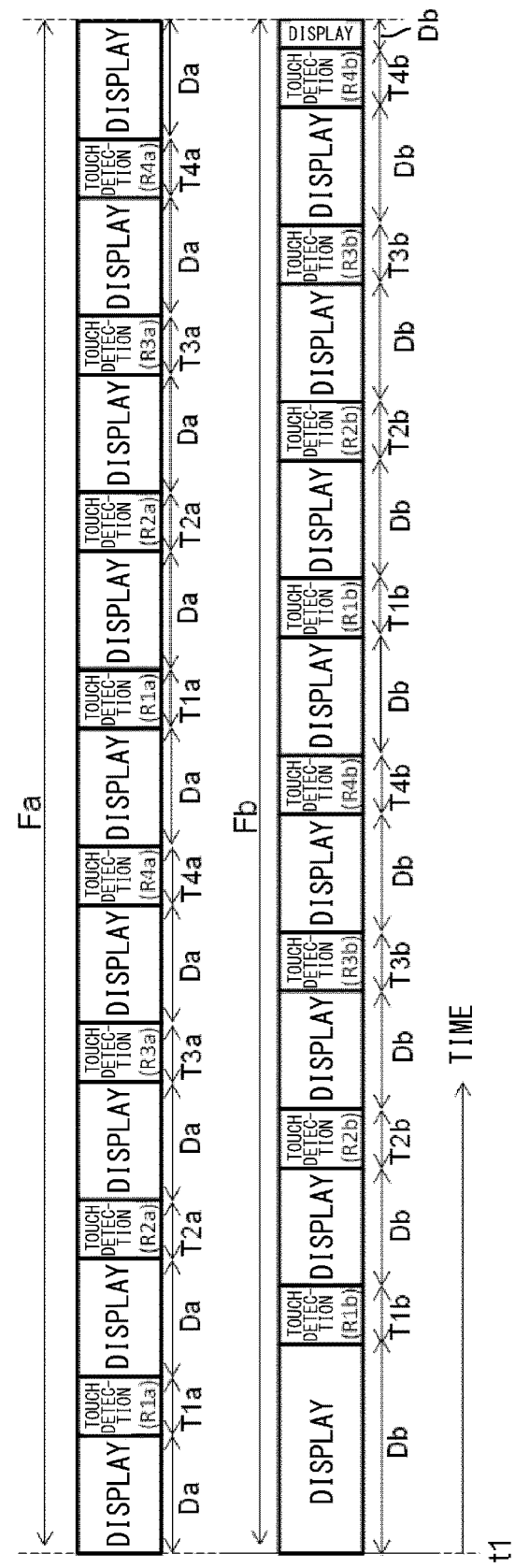
FIG. 9 is a diagram that shows timings within the first frame period and the second frame period in a second embodiment.

FIG. 9 shows timings within the first frame period Fa and the second frame period Fb in the second embodiment. The start timing of the first frame period Fa coincides with the start timing of the second frame period Fb. The configuration of the first frame period Fa is the same as that in the first embodiment.

The second display period Db positioned first in the second frame period Fb, i.e., one of the multiple second display periods Db, is longer than a first display period Da. Also, the second display period Db positioned last in the second frame period Fb, i.e., another one of the multiple second display periods Db, is shorter than a first display period Da. The second display periods Db positioned second through next to last in the second frame period Fb, i.e., the rest of the multiple second display periods Db, each have the same length as a first display period Da.

According to the present embodiment, since the start timing of the first frame period Fa coincides with the start timing of the second frame period Fb, when part of one image is allocated to and displayed on each of the first display device 22a and the second display device 22b, for example, flickering between the image on the first display device 22a and the image on the second display device 22b is less likely to be visually recognized. This can improve the quality of images displayed by the display system 1.

Third Embodiment

The third embodiment differs from the first embodiment in that part of multiple touch detection periods for multiple touch detection regions that are not adjacent to the neighboring display device 22 does not overlap with a display period. In the following, description will be given mainly for the differences from the first embodiment.

Figure 10:
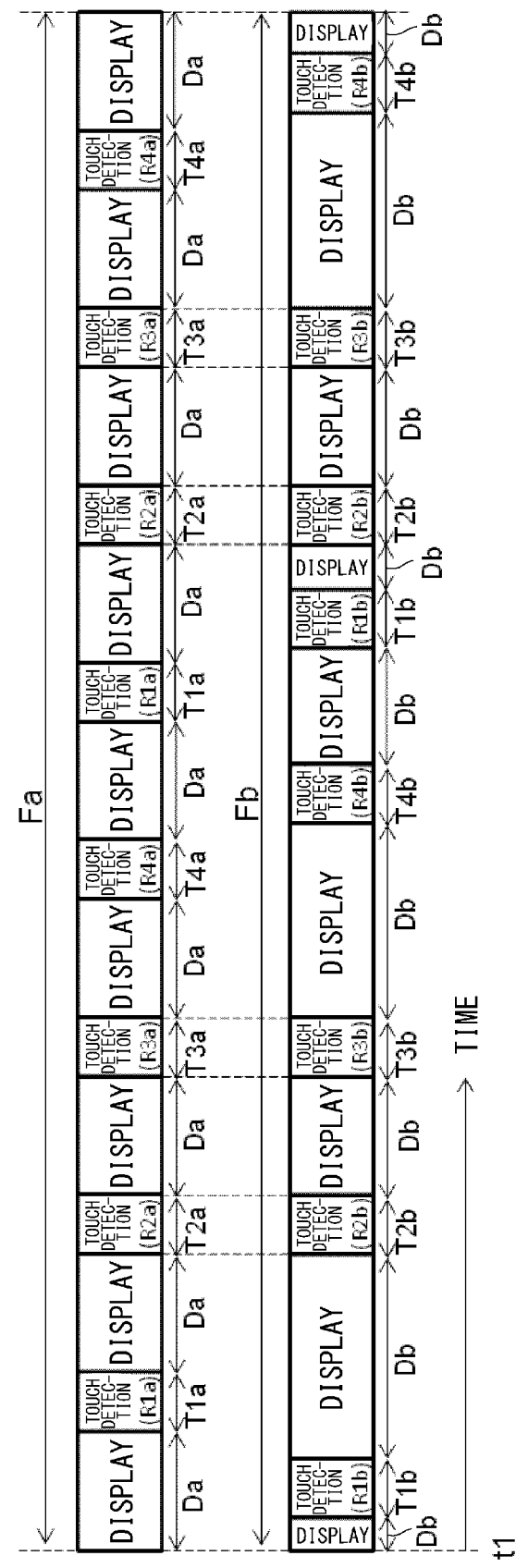
FIG. 10 is a diagram that shows timings within the first frame period and the second frame period in a third embodiment.

FIG. 10 shows timings within the first frame period Fa and the second frame period Fb in the third embodiment. The start timing of the first frame period Fa coincides with the start timing of the second frame period Fb. The configuration of the first frame period Fa is the same as that in the first embodiment.

The start and end timings of a specific first touch detection period T4a, for which touch detection in the first touch detection region R4a adjacent to the second display device 22b is performed, overlap with a second display period Db.

The start and end timings of a specific second touch detection period T1b, for which touch detection in the second touch detection region R1b adjacent to the first display device 22a is performed, overlap with a first display period Da.

The start and end timings of the first touch detection period T1a also overlap with a second display period Db. The start and end timings of the second touch detection period T4b also overlap with a first display period Da.

Meanwhile, the entire first touch detection period T2a overlaps with the second touch detection period T2b. Also, the entire first touch detection period T3a overlaps with the second touch detection period T3b. Accordingly, part of the multiple first touch detection periods other than the specific first touch detection periods T4a, i.e., the first touch detection periods T2a and T3a, each overlap with one of the second touch detection periods other than the specific second touch detection periods T1b.

It can be said that, in the present embodiment, the second touch detection periods T1b and T4b in the second frame period Fb in the comparative example are shifted such as to each overlap with a first display period Da, and the lengths of the preceding and the subsequent second display periods Db of each of the second touch detection periods T1b and T4b are changed accordingly. Each of the second touch detection periods T1b and T4b may be shifted to an earlier position, or may be shifted to a later position.

According to the present embodiment, the effects of the second embodiment can be obtained.

Fourth Embodiment

In the fourth embodiment, the length of part of the first display periods Da is changed from that of the third embodiment. In the following, description will be given mainly for the differences from the third embodiment.

Figure 11:
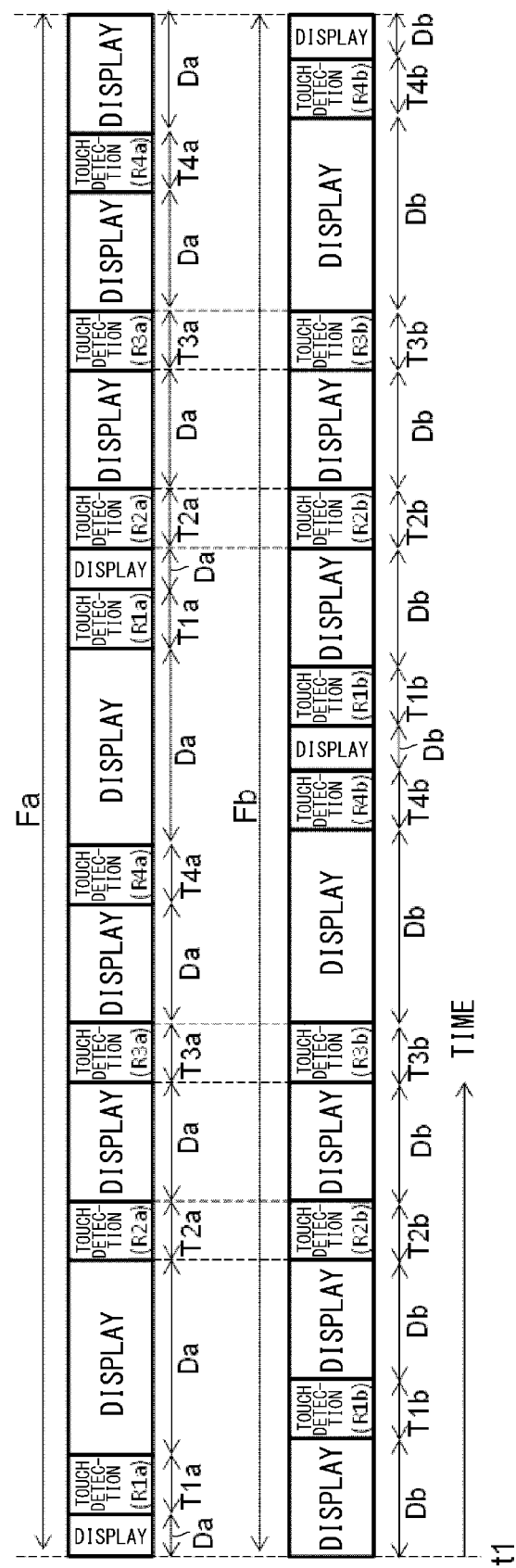
FIG. 11 is a diagram that shows timings within the first frame period and the second frame period in a fourth embodiment.

FIG. 11 shows timings within the first frame period Fa and the second frame period Fb in the fourth embodiment. Also in the present embodiment, the start and end timings of each of the first touch detection periods T1a and T4a overlap with a second display period Db. Also, the start and end timings of each of the second touch detection periods T1b and T4b overlap with a first display period Da.

The first one of the two first touch detection periods T1a is arranged before the first one of the two second touch detection periods T1b. The second one of the two first touch detection periods T1a is arranged after the second one of the two second touch detection periods T1b.

The first one of the two second touch detection periods T4b is arranged after the first one of the two first touch detection periods T4a. Also, the second one of the two second touch detection periods T4b is arranged after the second one of the two first touch detection periods T4a.

It can be said that, in the present embodiment, the first touch detection periods T1a in the first frame period Fa in the comparative example are shifted such as to each overlap with a second display period Db, and the lengths of the preceding and the subsequent first display periods Da of each of the first touch detection periods T1a are changed accordingly. In addition, it can be said that the second touch detection periods T4b in the second frame period Fb in the comparative example are shifted such as to each overlap with a first display period Da, and the lengths of the preceding and the subsequent second display periods Db of each of the second touch detection periods T4b are changed accordingly. Each of the first touch detection periods T1a and the second touch detection periods T4b may be shifted to an earlier position, or may be shifted to a later position. Instead of the first touch detection periods T1a and the second touch detection periods T4b, each of the first touch detection periods T4a and the second touch detection periods T1b may be shifted.

According to the present embodiment, the effects of the second embodiment can be obtained.

Fifth Embodiment

The fifth embodiment differs from the first embodiment in that the touch detection regions are vertically arranged. In the following, description will be given mainly for the differences from the first embodiment.

FIG. 12 is a diagram used to describe operations of the display devices 22 according to the fifth embodiment. The first touch detection regions R1a through R4a in the first display device 22a and the second touch detection regions R1b through R4b, not illustrated, in the second display device 22b are arranged in a direction intersecting the arrangement direction of the first display device 22a and the second display device 22b, i.e., in a vertical direction. Accordingly, the first touch detection regions R1a through R4a are adjacent to the second display device 22b, and the second touch detection regions R1b through R4b are adjacent to the first display device 22a.

As is the case in the first embodiment, the start and end timings of each of the first touch detection periods T1a through T4a overlap with one of the multiple second display periods Db, and the start and end timings of each of the second touch detection periods T1b through T4b overlap with one of the multiple first display periods Da.

Accordingly, as shown in FIG. 12, while touch detection in the first touch detection region R1a is performed in the first display device 22a, image display is performed in the second display device 22b. Also, while touch detection in each of the first touch detection regions R2a through R4a is performed, image display is performed in the second display device 22b. Similarly, while touch detection in each of the second touch detection regions R1b through R4b is performed in the second display device 22b, image display is performed in the first display device 22a.

Accordingly, touch detection in the first touch detection regions R1a through R4a is not affected by noise caused by touch detection in the second display device 22b, and touch detection in the second touch detection regions R1b through R4b is not affected by noise caused by touch detection in the first display device 22a. Therefore, also in the case where the touch detection regions are vertically arranged, incorrect detection in touch detection can be restrained. Also, greater flexibility in the configuration of the display system 1 can be allowed.

Sixth Embodiment

The sixth embodiment differs from the first embodiment in that the display devices 22 are vertically adjacent to each other, in which the touch detection regions are horizontally arranged. In the following, description will be given mainly for the differences from the first embodiment.

Figure 13:
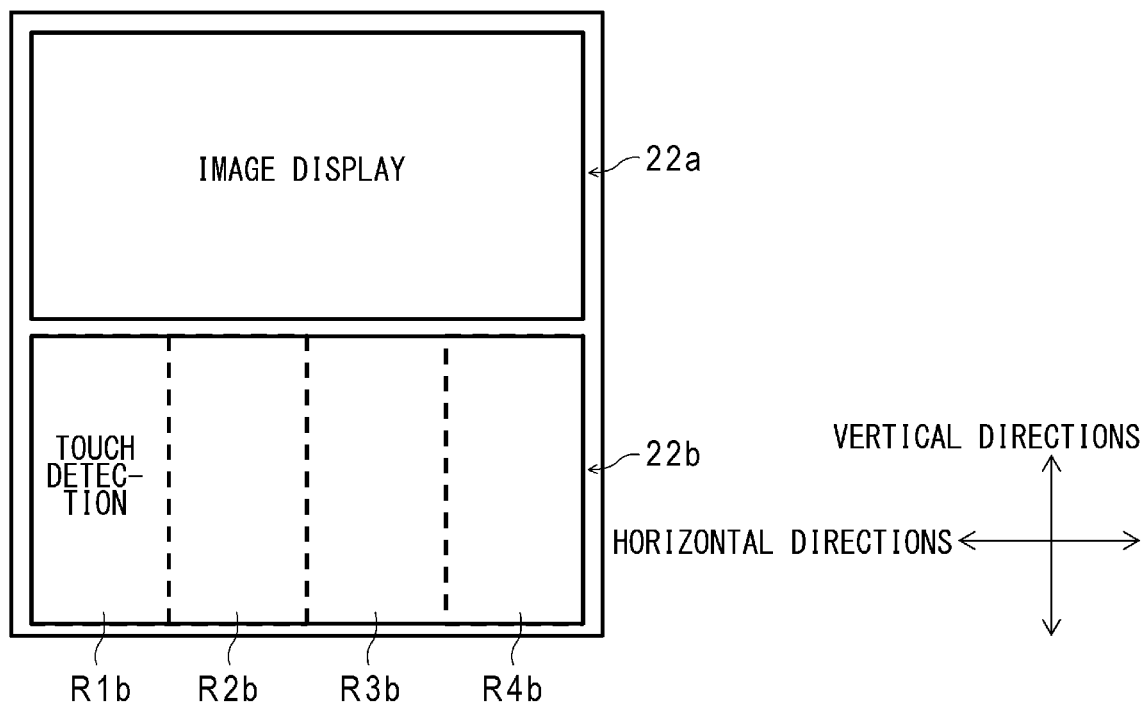
FIG. 13 is a diagram used to describe operations of the display devices according to a sixth embodiment.

FIG. 13 is a diagram used to describe operations of the display devices 22 according to the sixth embodiment. The first display device 22a and the second display device 22b are arranged vertically adjacent to each other. The first touch detection regions R1a through R4a, not illustrated, in the first display device 22a and the second touch detection regions R1b through R4b in the second display device 22b are arranged in a direction intersecting the arrangement direction of the first display device 22a and the second display device 22b, i.e., in a horizontal direction. Accordingly, the first touch detection regions R1a through R4a are adjacent to the second display device 22b, and the second touch detection regions R1b through R4b are adjacent to the first display device 22a.

As shown in FIG. 13, while touch detection in the second touch detection region R1b is performed in the second display device 22b, image display is performed in the first display device 22a. Also, while touch detection in each of the second touch detection regions R2b through R4b is performed, image display is performed in the first display device 22a. Similarly, while touch detection in each of the first touch detection regions R1a through R4a is performed in the first display device 22a, image display is performed in the second display device 22b. Accordingly, incorrect detection in touch detection can be restrained. Also, greater flexibility in the configuration of the display system 1 can be allowed.

Seventh Embodiment

The seventh embodiment differs from the first embodiment in that the display devices 22 are vertically adjacent to each other, in which the touch detection regions are vertically arranged. In the following, description will be given mainly for the differences from the first embodiment.

Figure 14:
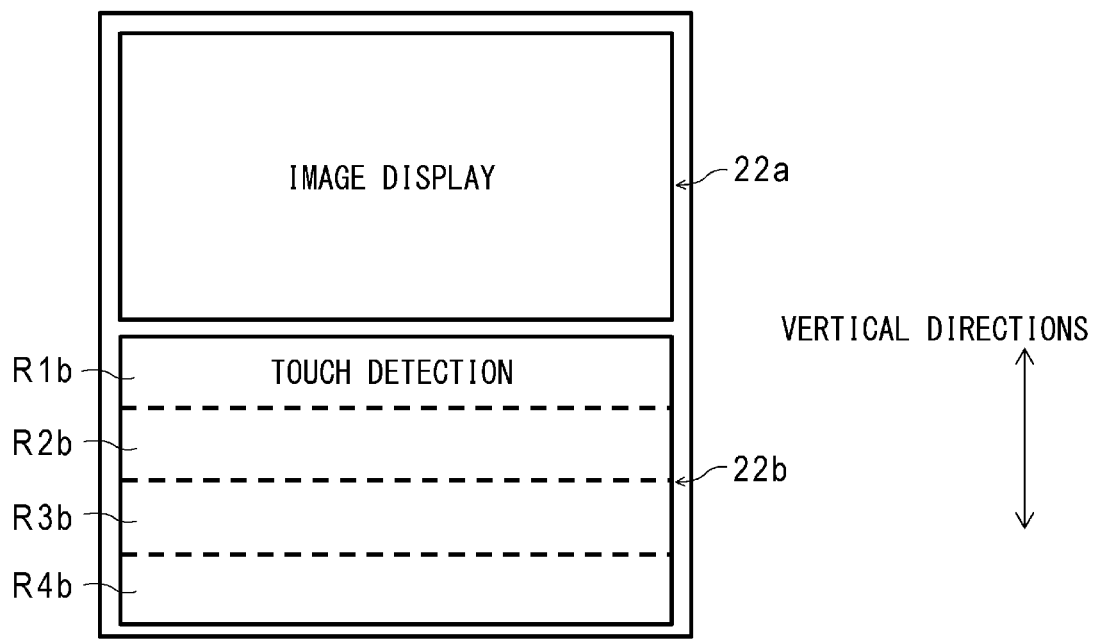
FIG. 14 is a diagram used to describe operations of the display devices according to a seventh embodiment.

FIG. 14 is a diagram used to describe operations of the display devices 22 according to the seventh embodiment. The first display device 22a and the second display device 22b are arranged vertically adjacent to each other. The first touch detection regions R1a through R4a, not illustrated, in the first display device 22a and the second touch detection regions R1b through R4b in the second display device 22b are arranged in a direction along the arrangement direction of the first display device 22a and the second display device 22b, i.e., in a vertical direction. Accordingly, the first touch detection region R4a is adjacent to the second display device 22b, and the second touch detection region R1b is adjacent to the first display device 22a.

As shown in FIG. 14, while touch detection in the second touch detection region R1b is performed in the second display device 22b, image display is performed in the first display device 22a. Similarly, while touch detection in the first touch detection region R4a is performed in the first display device 22a, image display is performed in the second display device 22b. Accordingly, incorrect detection in touch detection can be restrained. Also, greater flexibility in the configuration of the display system 1 can be allowed.

Eighth Embodiment

The eighth embodiment differs from the first embodiment in that the control device 12 in the host 10 transmits the synchronization signal SY to the first display device 22a and the second display device 22b. In the following, description will be given mainly for the differences from the first embodiment.

Figure 15:
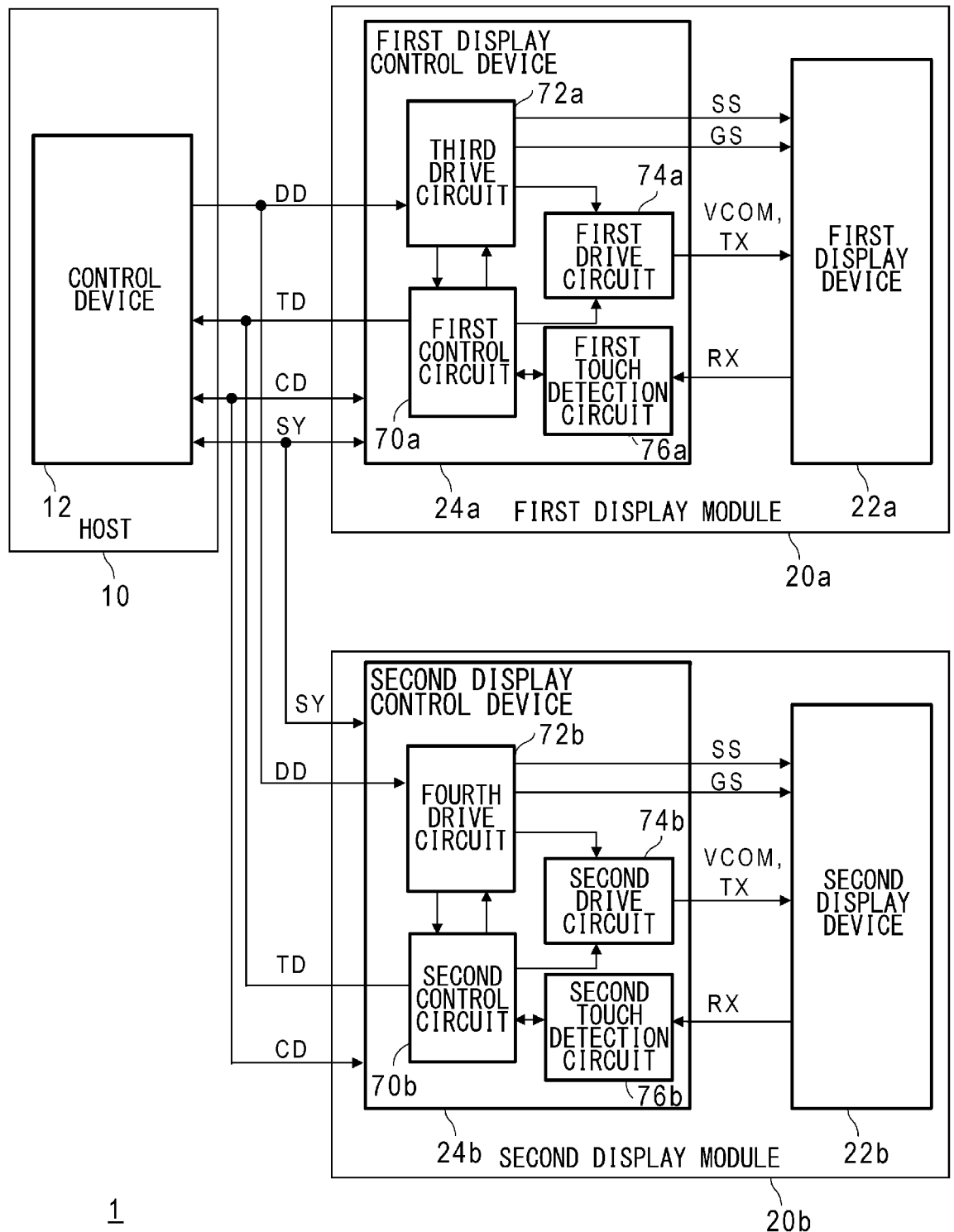
FIG. 15 is a block diagram of the display system according to an eighth embodiment.

FIG. 15 is a block diagram of the display system 1 according to the eighth embodiment. The control device 12 transmits the synchronization signal SY in common to the first display control device 24a and the second display control device 24b at the start timing of each first frame period, for example. The first display control device 24a does not transmit a synchronization signal to the second display control device 24b.

Figure 16:
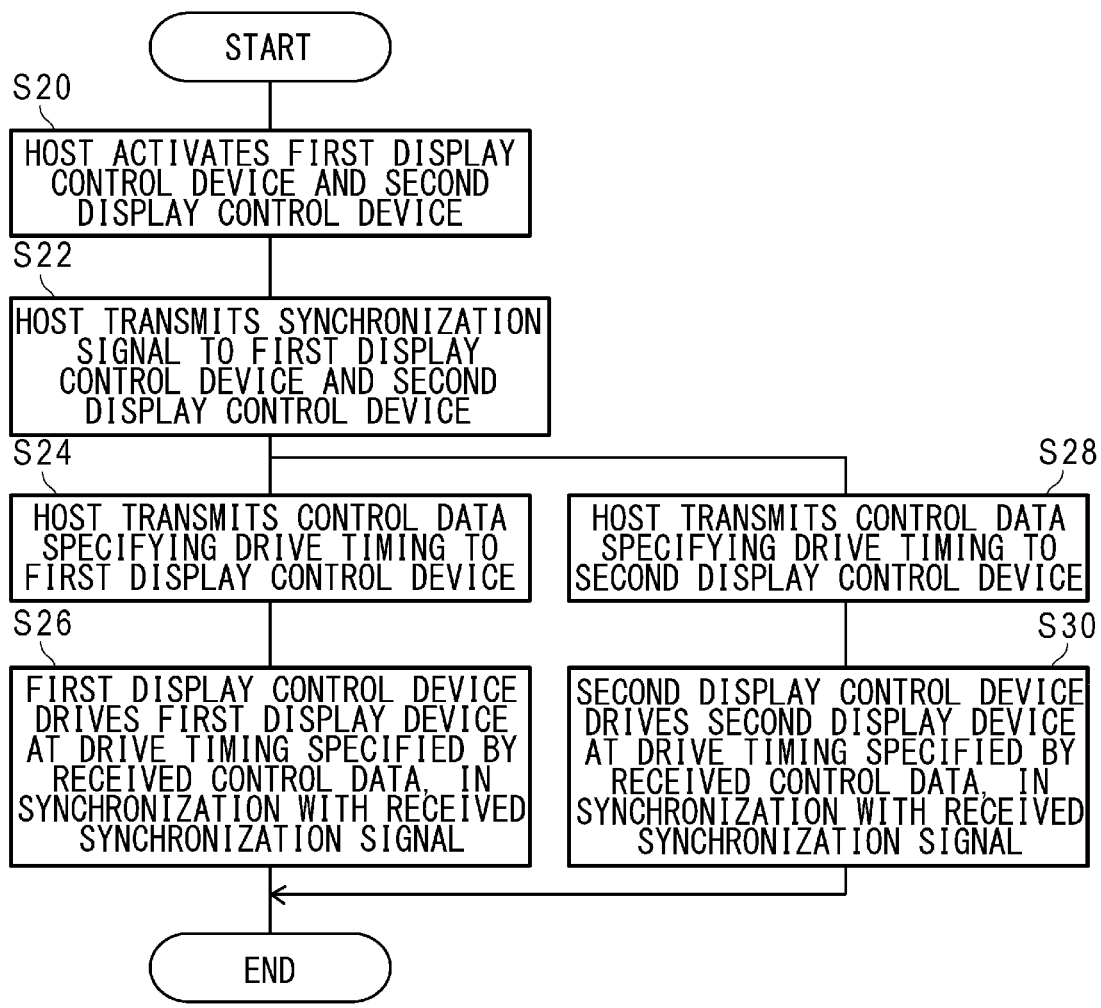
FIG. 16 is a flowchart that shows activation processing in the display system shown in FIG. 15.

FIG. 16 is a flowchart that shows activation processing in the display system 1 shown in FIG. 15. The host 10 activates the first display control device 24a and the second display control device 24b (S20), and transmits the synchronization signal SY to the first display control device 24a the second display control device 24b (S22). The host 10 transmits the control data CD specifying drive timing to the first display control device 24a (S24). In synchronization with the received synchronization signal SY, the first display control device 24a drives the first display device 22a at the drive timing specified by the control data CD thus received (S26), and the processing is terminated. In parallel with S24, the host 10 also transmits the control data CD specifying drive timing to the second display control device 24b (S28). In synchronization with the received synchronization signal SY, the second display control device 24b drives the second display device 22b at the drive timing specified by the control data CD thus received (S30), and the processing is terminated.

The present embodiment allows greater flexibility in the configuration of the display system 1.

The present disclosure has been described with reference to embodiments. The embodiments are intended to be illustrative only, and it will be obvious to those skilled in the art that various modifications to a combination of constituting elements or processes in the embodiments could be developed and that such modifications also fall within the scope of the present disclosure.

For example, three or more display devices 22 may be arranged adjacent to one another. Although the display control devices 24 are included in the display modules 20 in the embodiments, the display control devices 24 may be included in the host 10. Also, although each of the third drive circuit 72a and the fourth drive circuit 72b generates the reference clock signal in the embodiments, each of the first drive circuit 74a and the second drive circuit 74b may generate the reference clock signal. Also, the number of touch detection periods included in a frame period may be the same as the number of touch detection regions, or may be more than three times the number of touch detection regions. These modifications allow greater flexibility in the configuration of the display system 1.

The fifth or sixth embodiment may be combined with the second embodiment. Also, the seventh embodiment may be combined with any one of the second through fourth embodiments. Also, the eighth embodiment may be combined with any one of the second through seventh embodiments. An additional embodiment made by such a combination has the effect of each of the combined embodiments.

Figure 17:
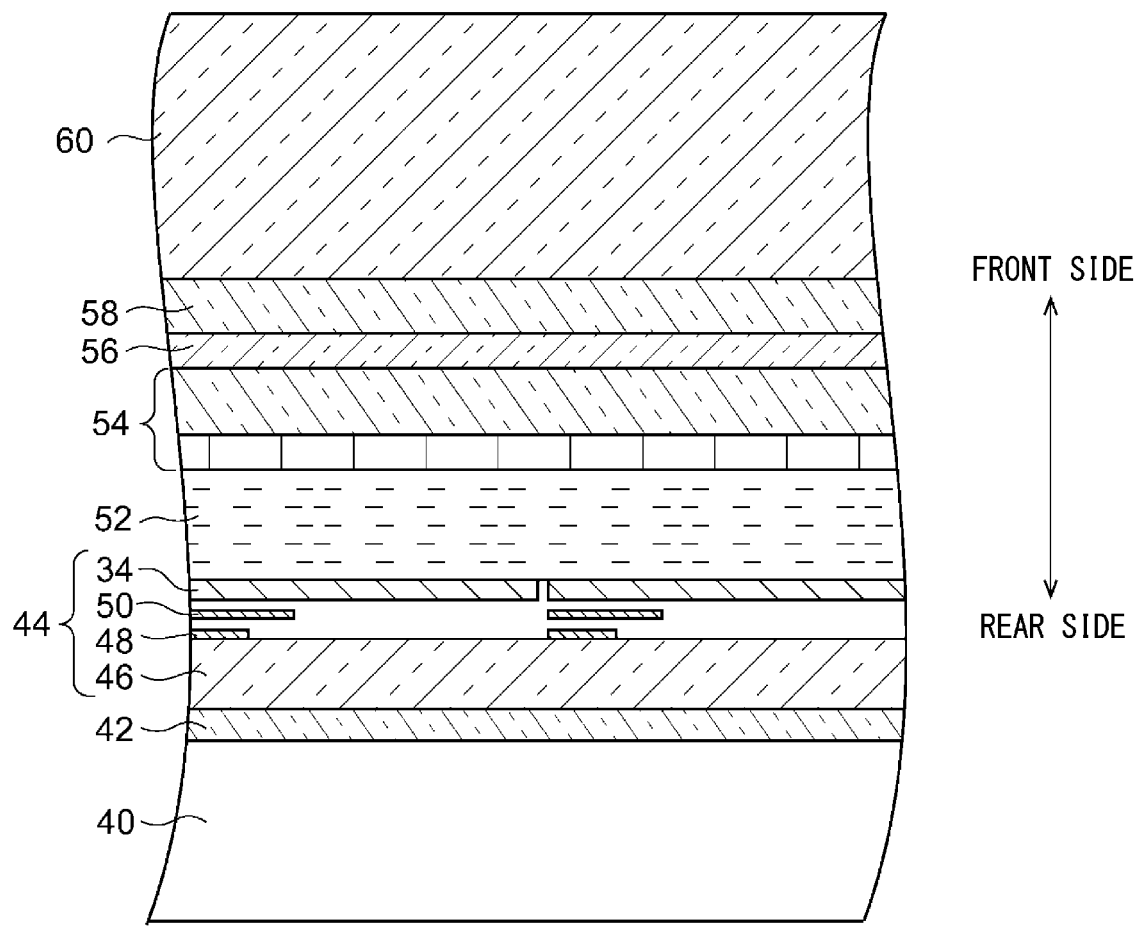
FIG. 17 is a longitudinal sectional view of a display device shown in FIG. 1.

Each display device 22 may have a configuration as described below, for example. FIG. 17 is a longitudinal sectional view of a display device 22 shown in FIG. 1. The display device 22 includes a backlight unit 40, a lower polarizer 42, a thin-film transistor substrate (hereinafter, referred to as a TFT substrate) 44, a liquid crystal layer 52, a color filter substrate 54, an upper polarizer 56, a bonding layer 58, and a protection layer 60, which are laminated and disposed in this order along a depth direction.

In the following, with regard to the depth directions of the display device 22, the side on which the protection layer 60 is positioned with respect to the TFT substrate 44 is defined as the front side, and the opposite side is defined as the rear side.

Using the light emitted from the backlight unit 40, the display device 22 emits image light toward the front side, or the viewer side.

The TFT substrate 44 includes a glass substrate 46 and also includes multiple gate electrodes 48, multiple source electrodes 50, and the multiple common electrodes 34, which are arranged on the front side of the glass substrate 46. The TFT substrate 44 also includes the multiple gate lines G1, G2, and so on, the multiple source lines S1, S2, and so on, the multiple pixel electrodes 32, and the multiple pixel switching elements 30 shown in FIG. 2, though illustration thereof is omitted. The liquid crystal layer 52 disposed on the front side of the TFT substrate 44 is controlled by means of lateral electric fields that occur between pixel electrodes 32 and common electrodes 34.

The bonding layer 58 has translucency and bonds the upper polarizer 56 and the protection layer 60. The bonding layer 58 may be formed by curing a transparent resin in a liquid state, such as optically clear resin (OCR), or curing a transparent adhesive sheet, such as optically clear adhesive (OCA), for example.

The protection layer 60 is a layer that has translucency and protects the display device 22, and the protection layer 60 is constituted by a glass substrate or a plastic substrate, for example. The protection layer 60 is also called a cover lens or the like.

A display system according to one aspect of the present disclosure includes:

a first display device;

a second display device disposed adjacent to the first display device;

a first touch detection circuit that performs detection of a touch by an object on the first display device;

a second touch detection circuit that performs detection of a touch by an object on the second display device; and a control circuit that controls the first display device, the second display device, the first touch detection circuit, and the second touch detection circuit, the first display device includes a first touch detection region adjacent to the second display device, the second display device includes a second touch detection region, a first frame period of the first display device includes a first display period for which the first display device displays an image and a first touch detection period for which the first touch detection circuit performs touch detection in the first touch detection region, a second frame period of the second display device includes a second display period for which the second display device displays an image and a second touch detection period for which the second touch detection circuit performs touch detection in the second touch detection region, and start and end timings of the first touch detection period overlap with the second display period.

According to this aspect, since the second display device displays an image during a first touch detection period, generation of noise due to touch detection in the second display device during a first touch detection period can be restrained. Therefore, incorrect detection in touch detection in a first touch detection region can be restrained.

In the display system according to the one aspect of the present disclosure, for example, the second touch detection region may be adjacent to the first display device, and start and end timings of the second touch detection period may overlap with the first display period.

In this case, since the first display device displays an image during a second touch detection period, generation of noise due to touch detection in the first display device during a second touch detection period can be restrained. Therefore, incorrect detection in touch detection in a second touch detection region can be restrained.

In the display system according to the one aspect of the present disclosure, for example, the first display device may include multiple first touch detection regions, and at least one of the multiple first touch detection regions may be adjacent to the second display device, the second display device may include multiple second touch detection regions, and at least one of the multiple second touch detection regions may be adjacent to the first display device, the first frame period may include multiple first display periods and multiple first touch detection periods, and the first display periods and the first touch detection periods may be alternately arranged, the first touch detection circuit may perform touch detection in a first touch detection region different for each first touch detection period, the second frame period may include multiple second display periods and multiple second touch detection periods, and the second display periods and the second touch detection periods may be alternately arranged, the second touch detection circuit may perform touch detection in a second touch detection region different for each second touch detection period, the start and end timings of each of the multiple first touch detection periods may overlap with one of the multiple second display periods, and the start and end timings of each of the multiple second touch detection periods may overlap with one of the multiple first display periods.

In this case, incorrect detection can be restrained.

In the display system according to the one aspect of the present disclosure, for example, the start timing of the first frame period may be different from the start timing of the second frame period.

In this case, since the length of each period and arrangement of periods within the first frame period can be made identical with the length of each period and arrangement of periods within the second frame period, complication of the configuration can be prevented.

In the display system according to the one aspect of the present disclosure, for example, the start timing of the first frame period may coincide with the start timing of the second frame period, the multiple first display periods may each have the same length, one of the multiple second display periods may be longer than a first display period, another one of the multiple second display periods may be shorter than a first display period, and the rest of the multiple second display periods may each have the same length as a first display period.

In this case, since the start timing of the first frame period coincides with the start timing of the second frame period, the quality of images displayed by the first display device and the second display device can be improved.

In the display system according to the one aspect of the present disclosure, for example, the start timing of the first frame period may coincide with the start timing of the second frame period, the first display device may include multiple first touch detection regions, and one of the multiple first touch detection regions may be adjacent to the second display device, the second display device may include multiple second touch detection regions, and one of the multiple second touch detection regions may be adjacent to the first display device, the first frame period may include multiple first display periods and multiple first touch detection periods, and the first display periods and the first touch detection periods may be alternately arranged, the first touch detection circuit may perform touch detection in a first touch detection region different for each first touch detection period, the second frame period may include multiple second display periods and multiple second touch detection periods, and the second display periods and the second touch detection periods may be alternately arranged, the second touch detection circuit may perform touch detection in a second touch detection region different for each second touch detection period, the start and end timings of a specific first touch detection period for which touch detection in a first touch detection region adjacent to the second display device is performed may overlap with a second display period, the start and end timings of a specific second touch detection period for which touch detection in a second touch detection region adjacent to the first display device is performed may overlap with a first display period, and part of the multiple first touch detection periods other than the specific first touch detection period may each overlap with one of the second touch detection periods other than the specific second touch detection period.

In this case, since the start timing of the first frame period coincides with the start timing of the second frame period, the quality of images displayed by the first display device and the second display device can be improved.

In the display system according to the one aspect of the present disclosure, for example, the multiple first touch detection regions and the multiple second touch detection regions may be arranged in a direction along the arrangement direction of the first display device and the second display device.

This allows greater flexibility in the configuration of the display system.

In the display system according to the one aspect of the present disclosure, for example, the multiple first touch detection regions and the multiple second touch detection regions may be arranged in a direction intersecting the arrangement direction of the first display device and the second display device.

This allows greater flexibility in the configuration of the display system.

In the display system according to the one aspect of the present disclosure, for example, the first display device may include multiple first common electrodes used for both image display and touch detection, and multiple first common electrodes may be arranged in each of the multiple first touch detection regions, the second display device may include multiple second common electrodes used for both image display and touch detection, and multiple second common electrodes may be arranged in each of the multiple second touch detection regions, the display system may include:
a first drive circuit that outputs a first touch drive signal to the multiple first common electrodes during a first touch detection period; and
a second drive circuit that outputs a second touch drive signal to the multiple second common electrodes during a second touch detection period,
the first touch detection circuit may perform, based on a first touch detection signal received from a first common electrode in a first touch detection region as a detection target, touch detection in the first touch detection region, and
the second touch detection circuit may perform, based on a second touch detection signal received from a second common electrode in a second touch detection region as a detection target, touch detection in the second touch detection region.

In this case, with the first common electrodes and the second common electrodes used for both image display and touch detection, the first display device and the second display device can be made thinner.

In the display system according to the one aspect of the present disclosure, for example,
the first display device and the second display device may be arranged horizontally adjacent to each other.

This allows greater flexibility in the configuration of the display system.

In the display system according to the one aspect of the present disclosure, for example,
the first display device and the second display device may be arranged vertically adjacent to each other.

This allows greater flexibility in the configuration of the display system.

A control method according to one aspect of the present disclosure is a control method used in a display system that includes:
a first display device;
a second display device disposed adjacent to the first display device;
a first touch detection circuit that performs detection of a touch by an object on the first display device; and
a second touch detection circuit that performs detection of a touch by an object on the second display device,
the first display device includes a first touch detection region adjacent to the second display device,
the second display device includes a second touch detection region,
a first frame period of the first display device includes a first display period for which the first display device displays an image and a first touch detection period for which the first touch detection circuit performs touch detection in the first touch detection region, and
a second frame period of the second display device includes a second display period for which the second display device displays an image and a second touch detection period for which the second touch detection circuit performs touch detection in the second touch detection region,
the control method includes
controlling the first display device, the second display device, the first touch detection circuit, and the second touch detection circuit such that start and end timings of the first touch detection period overlap with the second display period.

According to this aspect, since the second display device displays an image during a first touch detection period for which the first touch detection circuit performs touch detection in a first touch detection region, generation of noise due to touch detection in the second display device can be restrained. Therefore, incorrect detection in touch detection in a first touch detection region can be restrained.

While various embodiments have been described herein above, it is to be appreciated that various changes in form and detail may be made without departing from the spirit and scope of the invention(s) presently or hereafter claimed.

CROSS-REFERENCE TO RELATED APPLICATIONS

This application is a Continuation of International Application No. PCT/JP2020/002023, filed on Jan. 22, 2020, which in turn claims the benefit of Japanese Application No. 2019-020998, filed on Feb. 7, 2019, the disclosures of which Applications are incorporated by reference herein.

The invention claimed is:
1. A display system, comprising:
a first display device;
a second display device disposed adjacent to the first display device;
a first touch detection circuit that performs detection of a touch by an object on the first display device;
a second touch detection circuit that performs detection of a touch by an object on the second display device; and
a control circuit that controls the first display device, the second display device, the first touch detection circuit, and the second touch detection circuit, wherein
the first display device includes a first touch detection region adjacent to the second display device,
the second display device includes a second touch detection region,
a first frame period of the first display device includes a first display period for which the first display device displays an image and a first touch detection period for which the first touch detection circuit performs touch detection in the first touch detection region,
a second frame period of the second display device includes a second display period for which the second display device displays an image and a second touch detection period for which the second touch detection circuit performs touch detection in the second touch detection region, and
start and end timings of the first touch detection period overlap with the second display period.

2. The display system according to claim 1, wherein
the second touch detection region is adjacent to the first display device, and
start and end timings of the second touch detection period overlap with the first display period.

3. The display system according to claim 2, wherein
the first display device includes a plurality of first touch detection regions, and at least one of the plurality of first touch detection regions is adjacent to the second display device,
the second display device includes a plurality of second touch detection regions, and at least one of the plurality of second touch detection regions is adjacent to the first display device,
the first frame period includes a plurality of first display periods and a plurality of first touch detection periods, and the first display periods and the first touch detection periods are alternately arranged, the first touch detection circuit performs touch detection in a first touch detection region different for each first touch detection period, the second frame period includes a plurality of second display periods and a plurality of second touch detection periods, and the second display periods and the second touch detection periods are alternately arranged, the second touch detection circuit performs touch detection in a second touch detection region different for each second touch detection period, the start and end timings of each of the plurality of first touch detection periods overlap with one of the plurality of second display periods, and the start and end timings of each of the plurality of second touch detection periods overlap with one of the plurality of first display periods.

4. The display system according to claim 3, wherein the start timing of the first frame period is different from the start timing of the second frame period.

5. The display system according to claim 3, wherein
the start timing of the first frame period coincides with the start timing of the second frame period,
the plurality of first display periods each have the same length,
one of the plurality of second display periods is longer than the first display period,
another one of the plurality of second display periods is shorter than the first display period, and
the rest of the plurality of second display periods each have the same length as the first display period.

6. The display system according to claim 3, wherein the plurality of first touch detection regions and the plurality of second touch detection regions are arranged in a direction along an arrangement direction of the first display device and the second display device.

7. The display system according to claim 3, wherein the plurality of first touch detection regions and the plurality of second touch detection regions are arranged in a direction intersecting an arrangement direction of the first display device and the second display device.

8. The display system according to claim 3, wherein
the first display device comprises a plurality of first common electrodes used for both image display and touch detection, and the plurality of the first common electrodes are arranged in each of the plurality of first touch detection regions,
the second display device comprises a plurality of second common electrodes used for both image display and touch detection, and the plurality of the second common electrodes are arranged in each of the plurality of second touch detection regions,
the display system comprises:
a first drive circuit that outputs a first touch drive signal to the plurality of first common electrodes during the first touch detection period; and
a second drive circuit that outputs a second touch drive signal to the plurality of second common electrodes during the second touch detection period,
the first touch detection circuit performs, based on a first touch detection signal received from a first common electrode in a first touch detection region as a detection target, touch detection in the first touch detection region, and
the second touch detection circuit performs, based on a second touch detection signal received from a second common electrode in a second touch detection region as a detection target, touch detection in the second touch detection region.

9. The display system according to claim 2, wherein
the start timing of the first frame period coincides with the start timing of the second frame period,
the first display device includes a plurality of first touch detection regions, and one of the plurality of first touch detection regions is adjacent to the second display device,
the second display device includes a plurality of second touch detection regions, and one of the plurality of second touch detection regions is adjacent to the first display device,
the first frame period includes a plurality of first display periods and a plurality of first touch detection periods, and the first display periods and the first touch detection periods are alternately arranged,
the first touch detection circuit performs touch detection in a first touch detection region different for each first touch detection period,
the second frame period includes a plurality of second display periods and a plurality of second touch detection periods, and the second display periods and the second touch detection periods are alternately arranged,
the second touch detection circuit performs touch detection in a second touch detection region different for each second touch detection period,
the start and end timings of a specific first touch detection period for which touch detection in a first touch detection region adjacent to the second display device is performed overlap with a second display period,
the start and end timings of a specific second touch detection period for which touch detection in a second touch detection region adjacent to the first display device is performed overlap with a first display period, and
part of the plurality of first touch detection periods other than the specific first touch detection period each overlap with one of the second touch detection periods other than the specific second touch detection period.

10. The display system according to claim 1, wherein the first display device and the second display device are arranged horizontally adjacent to each other.

11. The display system according to claim 1, wherein the first display device and the second display device are arranged vertically adjacent to each other.

12. A control method used in a display system, the display system comprising:
a first display device;
a second display device disposed adjacent to the first display device;
a first touch detection circuit that performs detection of a touch by an object on the first display device; and
a second touch detection circuit that performs detection of a touch by an object on the second display device, wherein
the first display device includes a first touch detection region adjacent to the second display device,
the second display device includes a second touch detection region,
a first frame period of the first display device includes a first display period for which the first display device displays an image and a first touch detection period for which the first touch detection circuit performs touch detection in the first touch detection region, and a second frame period of the second display device includes a second display period for which the second display device displays an image and a second touch detection period for which the second touch detection circuit performs touch detection in the second touch detection region, the control method comprising
controlling the first display device, the second display device, the first touch detection circuit, and the second touch detection circuit such that start and end timings of the first touch detection period overlap with the second display period.

* * * * *